(12) United States Patent
Kurfirst

(10) Patent No.: US 11,468,758 B2
(45) Date of Patent: Oct. 11, 2022

(54) SYSTEMS AND METHODS FOR USING PRIMARY AND REDUNDANT DEVICES FOR DETECTING FALLS

(71) Applicant: Aetna Inc., Hartford, CT (US)

(72) Inventor: Dwayne Kurfirst, Hartford, CT (US)

(73) Assignee: Aetna Inc., Hartford, CT (US)

( * ) Notice: Subject to any disclaimer, the term of this patent is extended or adjusted under 35 U.S.C. 154(b) by 12 days.

(21) Appl. No.: 17/339,706

(22) Filed: Jun. 4, 2021

(65) Prior Publication Data

US 2022/0157144 A1    May 19, 2022

Related U.S. Application Data

(63) Continuation of application No. 17/098,009, filed on Nov. 13, 2020, now Pat. No. 11,055,981.

(51) Int. Cl.
| | |
|---|---|
| *H04N 5/44* | (2011.01) |
| *G08B 21/04* | (2006.01) |
| *G06N 20/00* | (2019.01) |
| *G08B 29/26* | (2006.01) |
| *G08B 29/18* | (2006.01) |

(52) U.S. Cl.
CPC .......... *G08B 21/043* (2013.01); *G06N 20/00* (2019.01); *G08B 21/0446* (2013.01); *G08B 29/185* (2013.01); *G08B 29/26* (2013.01)

(58) Field of Classification Search
CPC .............. G08B 21/043; G08B 21/0446; G08B 29/185; G08B 29/26; G06N 20/00
See application file for complete search history.

(56) References Cited

U.S. PATENT DOCUMENTS

| | | | |
|---|---|---|---|
| 6,208,251 B1 * | 3/2001 | Cadet ................... | A61B 5/1117 455/100 |
| 6,433,690 B2 * | 8/2002 | Petelenz ............... | G16H 40/67 340/689 |

(Continued)

OTHER PUBLICATIONS

"Active Tasks" http://researchkit.org/docs/docs/ActiveTasks/ActiveTasks.html#gait (2018).

(Continued)

*Primary Examiner* — Munear T Akki
(74) *Attorney, Agent, or Firm* — Leydig, Voit & Mayer, Ltd.

(57) ABSTRACT

In some instances, a fall detection system comprising a first fall detection device and a user device is provided. The fall detection device is configured to: detect an occurrence of a fall event associated with an individual based on sensor information from the one or more sensors and a fall detection model; and provide a first indication indicating the occurrence of the fall event. The user device is configured to: receive the first indication; cause display of a prompt requesting user feedback as to whether the individual fell based on the first indication and a second indication from a second fall detection device; provide update information indicating for the first fall detection device to update the fall detection model based on the user feedback; and provide user fall information associated with the occurrence of the fall event based on the user feedback.

19 Claims, 7 Drawing Sheets

(56) References Cited

U.S. PATENT DOCUMENTS

| | | | | |
|---|---|---|---|---|
| 7,961,109 | B2* | 6/2011 | Jang | A61B 5/0002 340/689 |
| 8,206,325 | B1* | 6/2012 | Najafi | A61B 5/0022 600/595 |
| 9,747,774 | B1* | 8/2017 | Sung | G08B 21/043 |
| 11,308,783 | B2* | 4/2022 | Galarneau | G08B 29/185 |
| 2003/0058111 | A1* | 3/2003 | Lee | G08B 13/19641 348/E7.086 |
| 2006/0214806 | A1* | 9/2006 | Clifford | G16Z 99/00 340/573.1 |
| 2007/0159332 | A1* | 7/2007 | Koblasz | A61B 5/411 340/572.1 |
| 2008/0129518 | A1* | 6/2008 | Carlton-Foss | G08B 25/009 379/45 |
| 2009/0315719 | A1* | 12/2009 | Song | G08B 21/0446 340/669 |
| 2011/0201972 | A1* | 8/2011 | Ten Kate | G08B 21/0446 600/595 |
| 2013/0002434 | A1* | 1/2013 | Cuddihy | G01S 13/18 342/28 |
| 2014/0276238 | A1* | 9/2014 | Osorio | G08B 21/0446 600/595 |
| 2016/0220153 | A1* | 8/2016 | Annegarn | A61B 5/7275 |
| 2017/0169689 | A1* | 6/2017 | Vagelos | G08B 21/043 |
| 2017/0193787 | A1* | 7/2017 | Devdas | G08B 25/005 |
| 2017/0352240 | A1* | 12/2017 | Carlton-Foss | G08B 21/0446 |
| 2018/0233018 | A1* | 8/2018 | Burwinkel | A61B 5/1117 |
| 2019/0228866 | A1* | 7/2019 | Weffers-Albu | G16H 40/63 |
| 2019/0320945 | A1* | 10/2019 | Johnson | G16H 80/00 |

OTHER PUBLICATIONS

Centers for Disease Control and Prevention "Preventing Falls: A Guide to Implementing Effective Community-Based Fall Prevention Programs," https://www.cdc.gov/homeandrecreationalsafety/falls/community_preventfalls.html (2015).
"Creating Smart Home Environments" https://www.ibm.com/able/aging-in-place.html (2020).
Figueiredo et al., "Exploring Smartphone Sensors for Fall Detection," J. Mobile User Experience (2016).
"Fitbit Launches Fitbit Care, A Powerful New Enterprise Health Platform for Wellness and Prevention and Disease Management" https://investor.fitbit.com/press/press-releases/press-release-details/2018/Fitbit-Launches-Fitbit-Care-A-Powerul-New-Enterprise-Health-Platform-for-Wellness-and-Prevention-and-Disease-Management/default.aspx (Sep. 19, 2018).
"Gait Analysis Services" Dicks Sporting Goods, https://www.dickssportinggoods.com/s/gait-analysis-services (2020).
Grimmer et al., Frontiers in Neurorobotics, 13 (Article 57) (Jul. 2019).
Habib et al., "Smartphone-Based Solutions for Fall Detection and Prevention: Challenges and Open Issues," https://www.ncbi.nlm.nih.gov/pmc/articles/PMC4029687/ (2014).
Hackaday "Gait Analysis" https://hackaday.com/tag/gait-analysis/ (Jul. 22, 2016).
Hannink et al., "Sensor-based Gait Parameter Extraction with Deep Convolutional Neural Networks" https://arxiv.org/pdf/1609.03323.pdf (Jan. 13, 2017).
"Healthy Lifestyle, Healthy Aging—Fall Prevention: Simple Tips to Prevent Falls" https://www.mayoclinic.org/healthy-lifestyle/healthy-aging/in-depth/fall-prevention/art-20047358 (2020).
"IBM and Avamere to Bring Cognitive Eldercare Research to Senior Living and Skilled Nursing Facilities" https://www03.ibm.com/press/us/en/pressrelease/51672.wss (Feb. 22, 2017).
"Improve patient outcomes with ProtoKinetics' Zeno Walkway and PKMAS software" https://www.protokinetics.com/improve-patient-outcomes-with-protokinetics-zeno-walkway-and-pkmas-software/?gclid=EAlalQobChMljLjElbXv6AIVBMlvlCh0JjQ0QEAAYASAAEgLFOPDBwE#contact-lold (2020).
Kang, Dake "Chinese Gait Recognition Tech IDs People by How They Walk," https://apnews.com/bf75dd1c26c947b7826d270a16e2658a (Nov. 6, 2018).
Mosher, Dave "A Pet Drone That Follows You Like A Lost Puppy," https://www.popsci.com/technologg/article/2013-05/meet-pet-drone-follows-people-lost-puppy-video/ (May 27, 2013).
Myers, Wyatt "9 Ways to Prevent Falling at Home," Everyday Health https://www.everydayhealth.com/longevity/future-planning/prevent-falls-at-home.aspx (Feb. 27, 2015).
Nagymáte et al., "Gait analysis using augmented reality markers," https://www.protocols.io/view/gait-analysis-using-augmented-reality-markers-gkzdux6?step=2 (Aug. 17, 2019).
National Council on Aging, "Falls Prevention: Keeping older adults safe and active," https://www.ncoa.org/healthy-aging/falls-prevention/ (2020).
National Institute on Aging "Prevent Falls and Fractures," https://www.nia.nih.gov/health/prevent-falls-and-fractures (2017).
Nieto-Hidalgo et al., "Gait Analysis Using Computer Vision Based on Cloud Platform and Mobile Device" https://www.hindawi.com/journals/misy/2018/7381264/ (Jan. 14, 2018).
O'Neill, Doug "Technology's Stand On Fall Prevention," https://www.youareunitd.com/2018/11/13/technologys-stand-on-fall-prevention/ (Nov. 13, 2018).
"Personal Gait Analysis Wearable Device" https://www.instructables.com/Personal-Gait-Analysis-Wearable-Device/ (2020).
"Pose estimation" https://www.tensorflow.org/lite/models/pose_estimation/overview (Mar. 31, 2020).
Rieland, Randy "Can Technology Predict Falls In Older Adults?" https://www.forbes.com/sites/nextavenue/2017/10/01/can-technology-predict-falls-in-older-adults/#41396795729d (Oct. 1, 2017).
Shi et al., "Fall Detection Algorithm Based on Triaxial Accelerometer and Magnetometer," Engineering Letters, 24(2) (2016).
"Take a Peek Inside Toronto Rehab's CEAL Workshop," The Globe and Mail (Nov. 16, 2011).
USC Leonard Davis School of Gerontology, "What is Fall Prevention?" http://stopfalls.org/what-is-fall-prevention/ (2020).
Wu et al., "Development of a Wearable-Sensor-Based Fall Detection System," International J. of Telemedicine and Applications (2015).
Zbigatron "Gait Recognition—Another Form of Biometric Identification" https://zbigatron.com/gait-recognition-another-form-of-biometric-identification/ (Dec. 5, 2017).
Hwang et al., "Fall Detection With Three-Axis Accelerometer and Magnetometer in a Smartphone," https://www.semanticscholar.org/paper/Fall-Detection-with-Three-Axis-Accelerometer-and-in-Hwang-Ryu/93112b2c8b8c2af0b4393c8d6fa8b90f39ac1639?p2df (2012).
Ren et al., "Research of Fall Detection and Fall Prevention Technologies: A Systematic Review," IEEE Access, vol. 7 (2019).
Yang et al., "Implementation of a Wearable Real-Time System for Physical Activity Recognition Based on Naive Bayes Classifier," ICBBT International Conference (2010).
U.S. Appl. No. 17/098,009, filed Nov. 13, 2020.

* cited by examiner

SYSTEMS AND METHODS FOR USING PRIMARY AND REDUNDANT DEVICES FOR DETECTING FALLS

CROSS-REFERENCE TO RELATED APPLICATIONS

This patent application claims the benefit of U.S. patent application Ser. No. 17/098,009, filed Nov. 13, 2020, which is incorporated by reference herein.

BACKGROUND

Individuals, especially elderly individuals, are very susceptible to falls, which may cause lasting injury and even death in some circumstances. Additionally, even if the individual does not fall, the risk of falling may cause anxiety or unnecessary stress to their caretakers or family members. For instance, if the fall is severe enough, the individual may lose consciousness or be in such a vulnerable state that they are unable to seek the attention that they require. A caretaker might not be able to be with the individual at all times and therefore, the individual may be late in receiving the proper medical attention. Even receiving medical attention a few minutes earlier may reduce the severity of the injury or even prevent death. Accordingly, there remains a technical need to provide a system that uses devices to detect an occurrence of a fall as well as to improve the response time if/when a fall occurs.

SUMMARY

In some examples, the present application may use multiple, redundant fall detection devices to detect a fall event (e.g., based on sensor information, the fall detection device may determine the individual has fallen). For example, the fall detection devices may provide information indicating the fall event to a user device. Based on this information, the user device may request feedback from the individual as to whether the individual has fallen. In some instances, if the user feedback indicates the individual has fallen, the user device may provide a notification to an emergency contact such as a caretaker or emergency personnel indicating the individual has fallen and requires assistance. In other instances, if the user feedback indicates the individual did not fall, the user device may provide update information to the fall detection devices to update their own fall detection models that are used with the sensor information to determine whether the individual has fallen. In other words, each fall detection device may have their own fall detection model that may be consistently updated and individualized for the particular individual based on the user feedback such that the fall detection model increases in the accuracy after each iteration.

In one aspect, a fall detection system includes a first fall detection device and a user device. The first fall detection device includes: one or more sensors; one or more first processors; and a first non-transitory computer-readable medium having first processor-executable instructions stored thereon. The first processor-executable instructions, when executed, facilitate: detecting an occurrence of a fall event associated with an individual based on sensor information from the one or more sensors and a fall detection model; and providing, to a user device, a first indication indicating the occurrence of the fall event. The user device includes: one or more second processors; and a second non-transitory computer-readable medium having second processor-executable instructions stored thereon. The second processor-executable instructions, when executed, facilitate: receiving, from the first fall detection device, the first indication; based on the first indication and a second indication from a second fall detection device, causing display of a prompt requesting user feedback as to whether the individual fell; based on the user feedback, providing, to the first fall detection device, update information indicating for the first fall detection device to update the fall detection model; and based on the user feedback, providing, to a back-end server, user fall information associated with the occurrence of the fall event.

Examples may include one of the following features, or any combination thereof. For instance, in some examples, the user feedback indicates the individual did not fall and the update information indicates for the first fall detection device to update the fall detection model based on the user feedback indicating that the individual did not fall. The first processor-executable instructions, when executed, further facilitate: updating the fall detection model based on the update information; and detecting an occurrence of a second fall event associated with the individual based on the updated fall detection model.

In some instances, the fall detection system further comprises a second fall detection device comprising: one or more second sensors; one or more third processors; and a third non-transitory computer-readable medium having third processor-executable instructions stored thereon. The third processor-executable instructions, when executed, facilitate: detecting the occurrence of the fall event associated with the individual based on second sensor information from the one or more second sensors and a second fall detection model; and providing, to the user device, the second indication indicating the occurrence of the fall event.

In some examples, the second processor-executable instructions, when executed, further facilitate: based on the user feedback, providing, to the second fall detection device, second update information indicating for the second fall detection device to update the second fall detection model based on the user feedback. The third processor-executable instructions, when executed, further facilitate: updating the second fall detection model based on the second update information; and detecting an occurrence of a second fall event associated with the individual based on the updated second fall detection model.

In some variations, the second processor-executable instructions, when executed, further facilitate: applying a first weighted value to the first indication from the first fall detection device; applying a second weighted value to the second indication from the second fall detection device; and determining a fall likelihood detection value based on applying the first weighted value to the first indication and applying the second weighted value to the second indication, and causing displaying of the prompt is based on the fall likelihood detection value.

In some instances, the second processor-executable instructions, when executed, further facilitate: updating the first weighted value and the second weighted value based on the first indication, the second indication, and the user feedback.

In some examples, the first fall detection device is a wearable device that is located on a rotatable body part of the individual, and the second fall detection device is another wearable device that is located on a symmetrical body part of the individual.

In some variations, the sensor information comprises movement information indicating movement of the individual and height information indicating a height corresponding to the first fall detection device, and the first processor-executable instructions, when executed, facilitate: receiving, from a first sensor, the movement information indicating the movement of the individual; and receiving, from a second sensor, the height information indicating the height corresponding to the first fall detection device.

In some instances, the movement information comprises an acceleration value or a velocity value, and the height information comprises a pressure measurement corresponding to the first fall detection device, a distance measurement corresponding to a distance from a ground surface to the first fall detection device, or a light reflection detection time corresponding to a reflection of an emitted light.

In some examples, providing the update information indicating for the first fall detection device to update the fall detection model is in response to the user feedback indicating the individual did not fall, and providing the user fall information associated with the occurrence of the fall event is in response to the user feedback indicating the individual fell.

In some variations, the fall detection system further comprises a back-end server comprising one or more fourth processors; and a fourth non-transitory computer-readable medium having fourth processor-executable instructions stored thereon. The fourth processor-executable instructions, when executed, facilitate: receiving the user fall information from the user device; and based on the user fall information, providing a notification to a fall detection alert device indicating the individual fell.

In some instances, the fourth processor-executable instructions, when executed, further facilitate: inputting the user fall information and prescription information associated with the individual into a machine learning dataset to generate medication information indicating whether a medication taken by the individual caused the individual to fall.

In some examples, the second indication from the second fall detection device is a lack of feedback information associated with the occurrence of the fall event from the second fall detection device.

In another aspect, a method for detecting whether an individual has fallen is provided. The method comprises: determining, by a user device, a first indication indicating whether a first fall detection device detected a fall event associated with an individual; determining, by the user device, a second indication indicating whether a second fall detection device detected the fall event associated with the individual; based on the first indication and the second indication, causing, by the user device, display of a prompt requesting user feedback indicating whether the individual fell; based on the user feedback indicating the individual fell or indicating the individual did not fall, providing, by the user device, update information to the first fall detection device, wherein the update information is used to update a fall detection model stored in the first fall detection device; and based on the user feedback indicating the individual fell, providing, by the user device, user fall information associated with the detected fall event to an enterprise computing system.

Examples may include one of the following features, or any combination thereof. For instance, in some examples, causing display of the prompt is based on a first weighted value associated with the first fall detection device and a second weighted value associated with the second fall detection device.

In some instances, the method further includes based on the user feedback, updating the first weighted value associated with the first fall detection device.

In some variations, the update information comprises information indicating the individual fell.

In some examples, the update information comprises one or more updates for the fall detection model of the first fall detection device.

In yet another aspect, another method for detecting whether an individual has fallen is provided. The method comprises: receiving, by a first fall detection device, sensor information indicating movement of an individual and a height corresponding to the first fall detection device; detecting, by the first fall detection device, an occurrence of a first fall event associated with the individual based on the sensor information and a fall detection model; in response to detecting the occurrence of the first fall event, providing, by the first fall detection device and to a user device, a first indication indicating the occurrence of the first fall event; based on providing the first indication, receiving, by the first fall detection device and from the user device, update information for the fall detection model; updating, by the first fall detection device, the fall detection model based on receiving the update information; and detecting, by the first fall detection device, an occurrence of a second fall event associated with the individual based on the updated fall detection model.

In some instances, the update information from the user device is based on the first indication, a second indication associated with another fall detection device, and user feedback associated with the first fall event.

All examples and features mentioned above may be combined in any technically possible way.

BRIEF DESCRIPTION OF THE DRAWINGS

The subject technology will be described in even greater detail below based on the exemplary figures, but is not limited to the examples. All features described and/or illustrated herein can be used alone or combined in different combinations. The features and advantages of various examples will become apparent by reading the following detailed description with reference to the attached drawings which illustrate the following.

DETAILED DESCRIPTION

Examples of the presented application will now be described more fully hereinafter with reference to the accompanying FIGs., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

Figure 1:
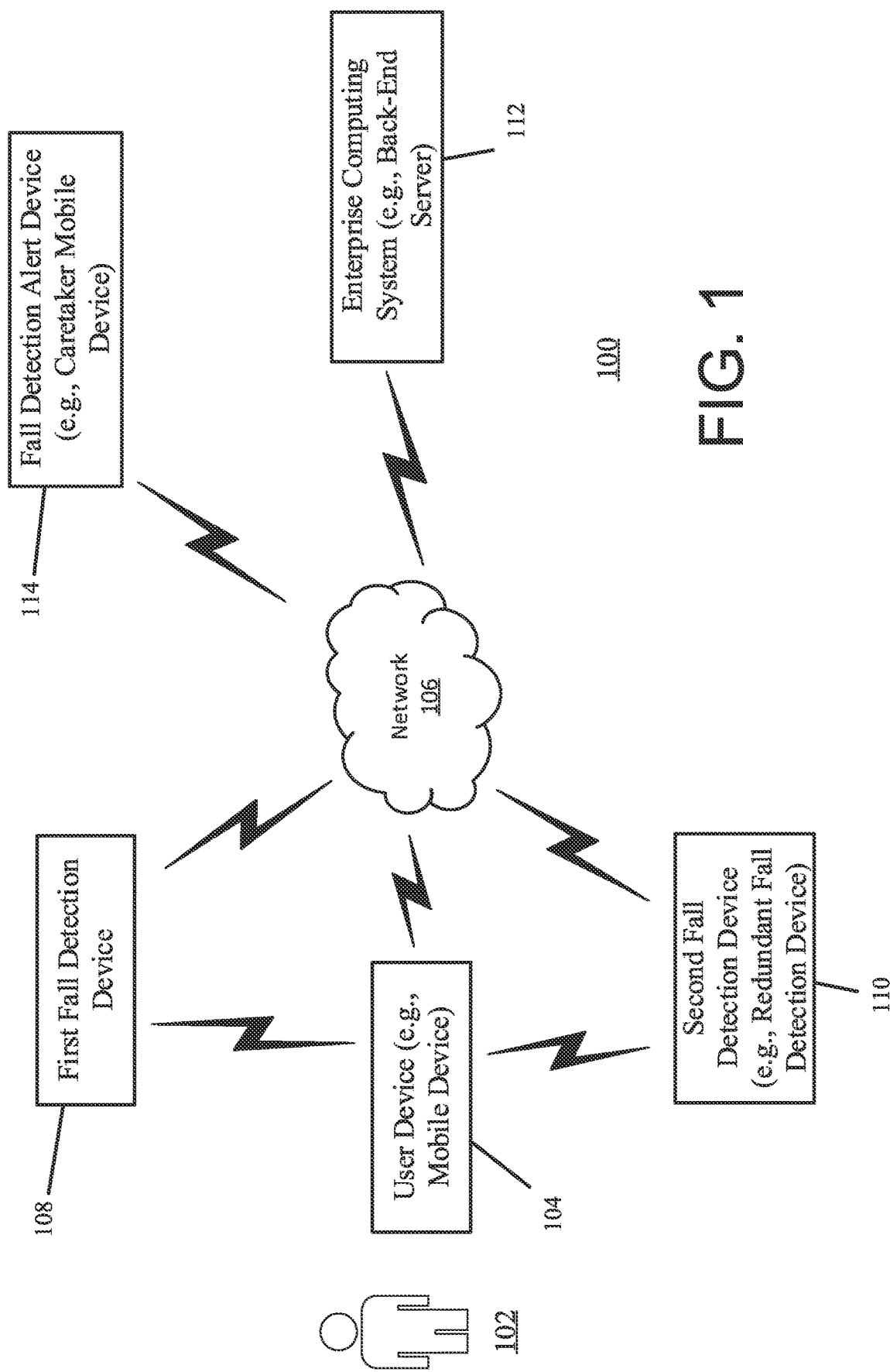
FIG. 1 is a simplified block diagram depicting an exemplary computing environment in accordance with one or more examples of the present application.

Systems, methods, and computer program products are herein disclosed that provide for using multiple devices including a primary and redundant fall detection device to detect whether an individual has fallen. FIG. 1 is a simplified block diagram depicting an exemplary environment in accordance with an example of the present application. The environment 100 includes an individual (e.g., user) 102, a user device (e.g., mobile device) 104 associated with the individual 102, a first fall detection device (e.g., a primary fall detection device) 108, a second fall detection device (e.g., a redundant fall detection device) 110, an enterprise computing system (e.g., back-end server) 112, and a fall detection alert device (e.g., caretaker mobile device) 114. Although the entities within environment 100 may be described below and/or depicted in the FIGs. as being singular entities, it will be appreciated that the entities and functionalities discussed herein may be implemented by and/or include one or more entities.

The entities within the environment 100 such as the user device 104, the first fall detection device 108, the second fall detection device 110, the enterprise computing system 112, and/or the fall detection alert device 114 may be in communication with other systems within the environment 100 via the network 106. The network 106 may be a global area network (GAN) such as the Internet, a wide area network (WAN), a local area network (LAN), or any other type of network or combination of networks. The network 106 may provide a wireline, wireless, or a combination of wireline and wireless communication between the entities within the environment 100. Additionally, and/or alternatively, the user device 104 may be in communication with the first and/or second fall detection devices 108, 110 without using the network 106. For instance, the user device 104 may use one or more communication protocols such as WI-FI or BLUETOOTH to communicate with the first and/or second fall detection devices 108, 110.

Individual 102 may operate, own, and/or otherwise be associated with a user device 104. For instance, the user device 104 may be a mobile phone such as a smartphone that is owned and/or operated by the individual 102. The individual 102 may provide information to the other entities of environment 100 such as the enterprise computing system 112 using the user device 104. For example, the user device 104 may receive user input from the individual 102 such as indications to download, operate, and/or manage a software application associated with an enterprise organization. The enterprise organization may be any type of corporation, company, organization, and/or other institution. The software application may be an application that is used by the user device 104 to communicate with the first and/or second fall detection devices 108, 110 as well as the enterprise computing system 112. For example, the first and/or second fall detection devices 108, 110 may communicate with and/or provide information to the user device 104 such as notifications and/or additional information indicating whether the individual 102 has fallen. Based on this information, the user device 104 may determine whether the individual 102 has fallen.

The user device 104 may be and/or include, but is not limited to, a desktop, laptop, tablet, mobile device (e.g., smartphone device, or other mobile device), smart watch, an internet of things (IOT) device, or any other type of computing device that generally comprises one or more communication components, one or more processing components, and one or more memory components. The user device 104 may be able to execute software applications managed by, in communication with, and/or otherwise associated with the enterprise organization.

The first and second fall detection devices 108, 110 may be any device that detects occurrences of a fall event. The fall event may be whenever the sensor information indicates a possibility that the individual 102 has fallen. In other words, in some examples, the fall event may indicate a fall, but in other examples, the fall detection devices 108, 110 may have inaccurately determined that the individual 102 has fallen even though the individual 102 did not fall. As will be explained below, the fall detection devices 108, 110 may be continuously updated and individualized for the individual 102 such that after each iteration, they may more accurately determine whether the individual 102 has fallen.

The first and second fall detection devices 108, 110 may be operatively coupled to or located on different portions of the individual's body. For instance, the first fall detection device 108 may be located on a portion of the individual's body (e.g., a body part) that is movable or rotatable such as a limb or appendage (e.g., an arm or a leg). The second fall detection device 110 may be located on a portion of the individual's body that is more stationary (e.g., not moving as much) or on a more symmetrical part of the body such as the individual's neck, chest, or back area. In some instances, the first and second fall detection devices 108, 110 may be wearable devices such as a wearable watch, a wearable necklace, belt, or glasses.

The first and second fall detection devices 108, 110 may include and/or use one or more sensors to detect the occurrence of the fall event and provide this information to the user device 104. Additionally, and/or alternatively, the first and second fall detection devices 108, 110 may receive update information from the user device 104 and may use the update information to update one or more models/algorithms that are used for detecting the fall event. This will be described in further detail below.

The enterprise computing system 112 is a computing system that is associated with the enterprise organization. The enterprise computing system 112 includes one or more computing devices, computing platforms, systems, servers, and/or other apparatuses capable of performing tasks, functions, and/or other actions for the enterprise organization. In some instances, the enterprise computing system 112 may, for example, receive and/or provide information from the user device 104 and/or the fall detection alert device 114. For instance, the enterprise computing system 112 may receive information indicating whether the individual 102 has fallen. Based on this received information, the enterprise computing system 112 may provide a notification or alert to the fall detection alert device 114 indicating the individual 102 has fallen.

The enterprise computing system 112 may be implemented using one or more computing platforms, devices, servers, and/or apparatuses. In some variations, the enterprise computing system 112 may be implemented as engines, software functions, and/or applications. In other words, the functionalities of the enterprise computing system 112 may be implemented as software instructions stored in storage (e.g., memory) and executed by one or more processors.

The fall detection alert device 114 may be a mobile phone such as a smartphone that is owned and/or operated by a caretaker, family member, an emergency contact, medical personal and/or agencies (e.g., hospitals, the individual's physician, and so on), or another person or entity associated with the individual 102 (e.g., a person that the individual 102 has identified that should be notified in the event of a fall). For example, the individual 102 may provide information to the enterprise computing system 112 indicating an emergency contact such as a caretaker. Based on the enterprise computing system 112 receiving information indicating the individual 102 has fallen, the enterprise computing system 112 may provide information such as a notification to the fall detection alert device 114. The fall detection alert device 114 may cause display of the notification indicating the individual 102 has fallen such that the caretaker may respond and assist the individual 102.

The fall detection alert device 114 may be and/or include, but is not limited to, a desktop, laptop, tablet, server, mobile device (e.g., smartphone device, or other mobile device), smart watch, an internet of things (IOT) device, or any other type of computing device that generally comprises one or more communication components, one or more processing components, and one or more memory components. The fall detection alert device 114 may be able to execute software applications managed by, in communication with, and/or otherwise associated with the enterprise organization.

It will be appreciated that the exemplary environment depicted in FIG. 1 is merely an example, and that the principles discussed herein may also be applicable to other situations—for example, including other types of institutions, organizations, devices, systems, and network configurations. For example, in other instances, the user device 104 may use additional redundant fall detection devices and/or other sensors (e.g., environmental sensors) to determine whether the individual 102 has fallen. As will be described herein, the environment 100 may be used by health care enterprise organizations. However, in other instances, the environment 100 may be used by other types of enterprise organizations such as financial institutions or insurance institutions.

Figure 2:
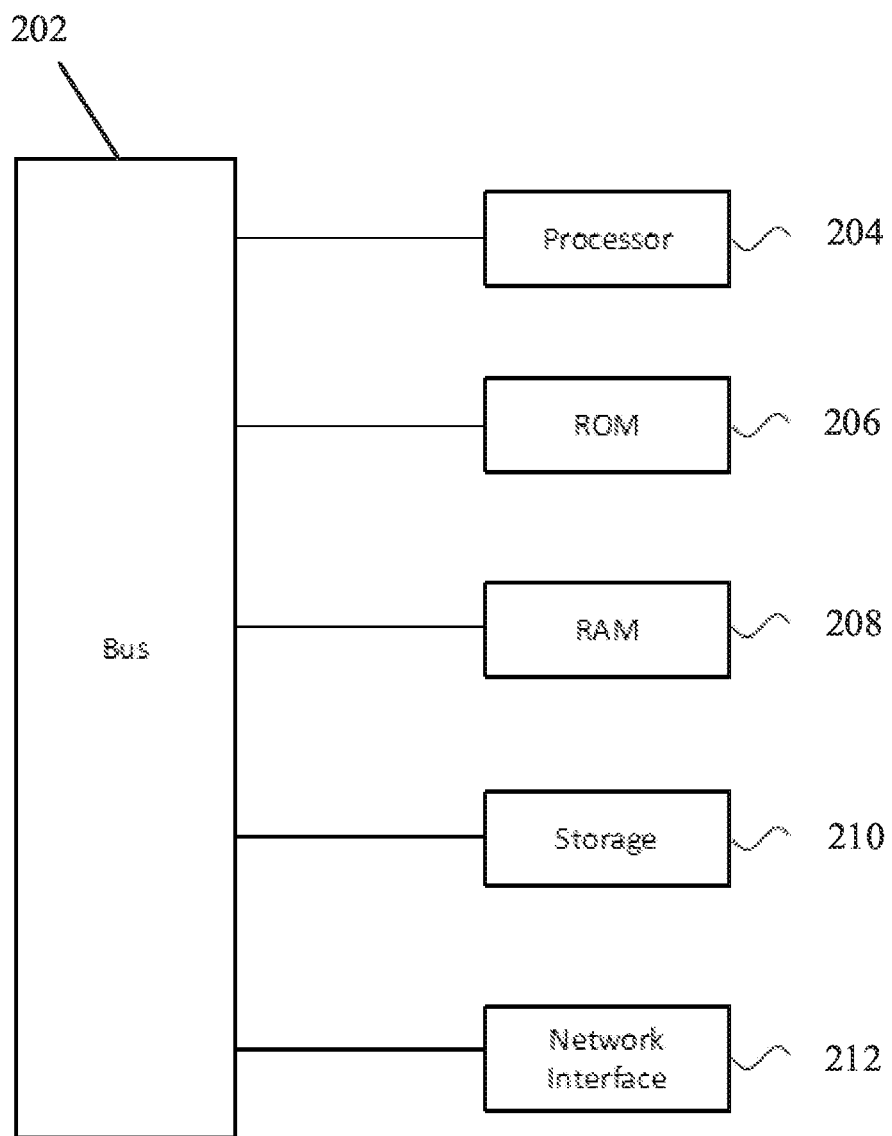
FIG. 2 is a simplified block diagram of one or more devices or systems within the exemplary environment of FIG. 1.

FIG. 2 is a block diagram of an exemplary system and/or device 200 within the environment 100. The device/system 200 includes a processor 204, such as a central processing unit (CPU), controller, and/or logic, that executes computer executable instructions for performing the functions, processes, and/or methods described herein. In some examples, the computer executable instructions are locally stored and accessed from a non-transitory computer readable medium, such as storage 210, which may be a hard drive or flash drive. Read Only Memory (ROM) 206 includes computer executable instructions for initializing the processor 204, while the random-access memory (RAM) 208 is the main memory for loading and processing instructions executed by the processor 204. The network interface 212 may connect to a wired network or cellular network and to a local area network or wide area network, such as the network 106. The device/system 200 may also include a bus 202 that connects the processor 204, ROM 206, RAM 208, storage 210, and/or the network interface 212. The components within the device/system 200 may use the bus 202 to communicate with each other. The components within the device/system 200 are merely exemplary and might not be inclusive of every component, server, device, computing platform, and/or computing apparatus within the device/system 200. For example, as will be described below, the first and second fall detection devices 108, 110 may include some of the components within the device/system 200 and may also include further components such as one or more sensors. Additionally, and/or alternatively, the device/system 200 may further include components that might not be included within every entity of environment 100.

Figure 3:
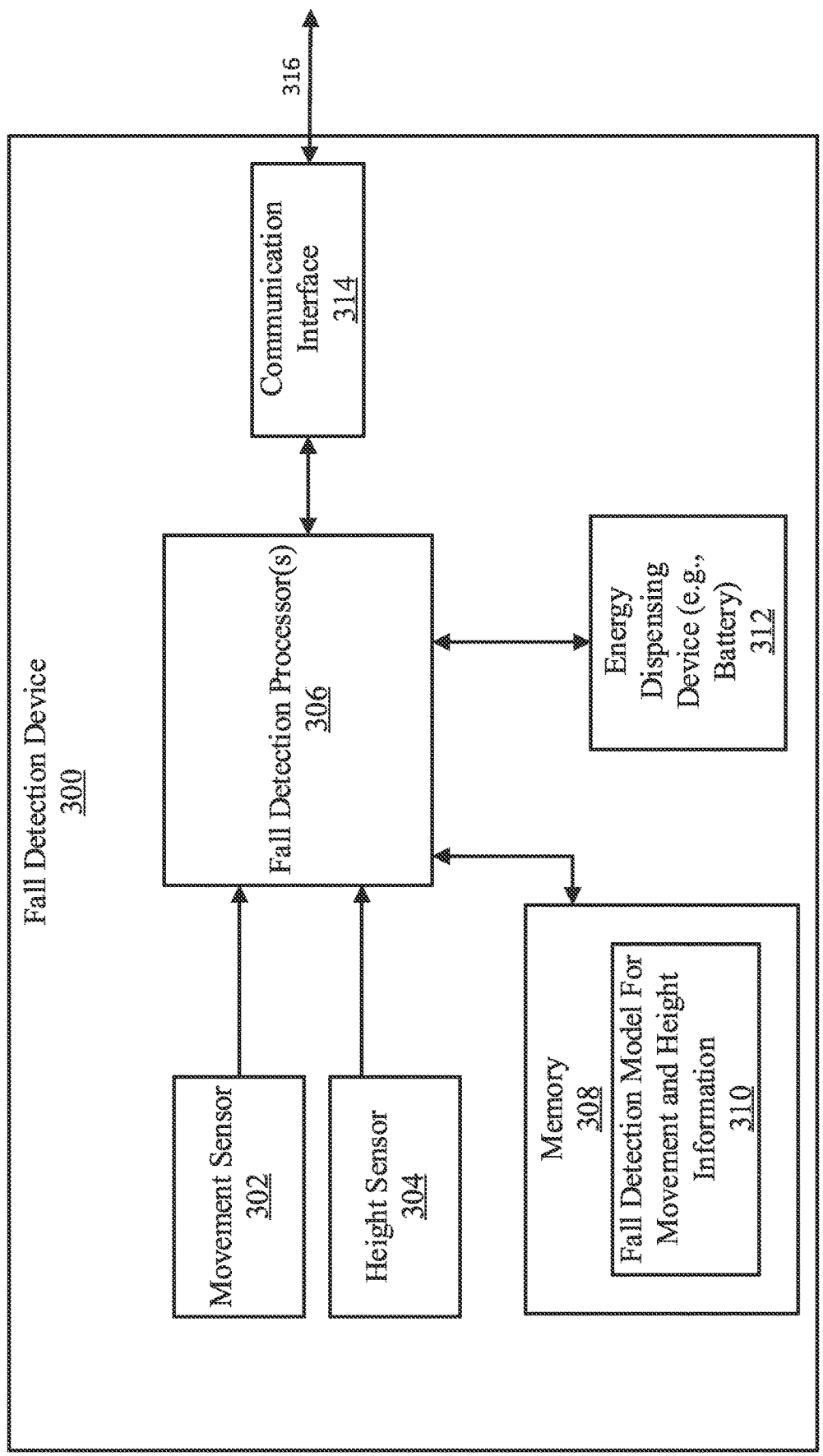
FIG. 3 is another simplified block diagram depicting a fall detection device in accordance with one or more examples of the present application.

FIG. 3 is a simplified block diagram depicting a fall detection device 300 in accordance with one or more examples of the present application. In some examples, the fall detection device 300 may be the first and/or second fall detection devices 108, 110 of environment 100. In other words, the first and second fall detection devices 108, 110 may include the components of the fall detection device 300 and may, in some variations, include the same components as each other. In other examples, the first and second fall detection devices 108, 110 may include different components. For example, the first fall detection device 108 may include different types of sensors as compared to the second fall detection device 110.

The fall detection device 300 includes multiple components such as a movement sensor 302, a height sensor 304, fall detection processor(s) 306, memory 308, an energy dispensing device 312 (e.g., battery), and/or a communication interface 314. The movement sensor 302 may receive/detect movement associated with the individual 102. The movement sensor 302 may be any type of sensor that is capable of detecting movement of the individual 102 and may be/include a digital compass, gyroscope, accelerometer, and/or magnetometer. For example, as mentioned above, one of the fall detection devices 108 or 110 may be operatively coupled to or located on an individual's body part that is movable or rotatable such as a limb or appendage (e.g., leg). The movement sensor 302 may detect movement associated with the body part. For instance, the movement sensor 302 may detect a change in position (e.g., displacement), a velocity value, and/or an acceleration value associated with the body part such as the individual's leg. In some examples, by using two fall detection devices 108 and 110 that are positioned at different body parts (e.g., leg and neck), the fall detection devices 108 and 110 may detect different movement values associated with the different body parts and the user device 104 may use this difference to determine whether the individual 102 has fallen. For instance, the first fall detection device 108 may be positioned on the individual's leg and the second fall detection device 108 may be positioned on the individual's neck (e.g., a necklace of some sort that the individual wears). For example, during a fall event (e.g., when the individual falls), both devices 108, 110 may detect a movement value such as an acceleration value (e.g., around 7.2 miles per hour (MPH) during free-fall). In another example, the individual 102 may be walking or moving and as such, the device 108 that is located on the leg or arm of the individual 102 may detect an acceleration value whereas the device 110 that is located on the neck might not detect an acceleration value. In such examples, the device 108 that is located on the leg or arm may have more false positives as it may detect acceleration values that are close to the free-fall acceleration value (e.g., 7.2 MPH) whereas the neck device 110 might not. In other words, the neck device 110 may be more accurate in such scenarios/examples. In yet another example, the individual 102 may be stationary, but may bend down. In such examples, the neck device 110 may have more false positives than the leg/arm device 108 (e.g., the neck device 110 may detect acceleration values that are closer to the free-free acceleration value than the leg/arm device 108). In other words, the leg/arm device 108 may be more accurate in such scenarios/examples. As such, by using two devices 108 and 110 located at different locations of the individual's body (e.g., leg/arm compared to neck), the two devices 108 and 110 may be used in combination to more accurately predict when the individual 102 has fallen in numerous different scenarios/examples.

In some examples, based on the number of false positives determined by the devices 108 and/or 110, the user device 104 (e.g., the application executing on the user device 104) may pause determining whether the individual 102 has fallen for a certain time period (e.g., an hour). For example, the individual 102 may be performing an event such as riding a roller-coaster that may cause many false positives. As such, the user device 104 may receive user feedback and/or may automatically pause determining whether the individual 102 has fallen based on receiving many false positives (e.g., the devices 108 and/or 110 may consistently detect acceleration values close to the free-fall acceleration value based on riding the roller-coaster and even though the individual 102 has not actually fallen).

The height sensor 304 may receive/detect a height associated with the fall detection device 300. For example, the fall detection device 300 may be positioned on a particular body part of the individual 102 such as the neck and the height sensor 304 may detect a height (e.g., a distance from the ground to the sensor) of the particular body part/the fall detection device 300. The height sensor 304 may further determine a change of this height. For instance, during a fall event, the height sensor 304 may detect a change in height of the body part (e.g., the height of an individual 102 standing upright as compared to laying down).

The height sensor 304 may be any type of sensor that is capable of detecting a height and may be/include a pressure sensor, a distance sensor, and/or a light sensor. For example, the height sensor 304 may be a pressure sensor that detects pressure (e.g., atmospheric pressure) at a particular height. Additionally, and/or alternatively, the height sensor 304 may be or include a distance sensor. The distance sensor may detect a distance (e.g., height) from the ground to the sensor itself. Additionally, and/or alternatively, the height sensor 304 may be or include a light sensor. The light sensor may emit a light or laser and determine a length of time to receive back a reflection of the emitted light/laser. Based on the amount of time to receive back the reflection, the light sensor may determine a height of the fall detection device 300. By using two fall detection devices 108, 110 positioned at different locations of the individual's body, the user device 104 may have a better understanding as to whether the individual 102 has fallen. For example, the fall detection device 108 located on the individual's leg will not register as much of a height change when the individual 102 is standing as compared to lying down. However, the fall detection device 110 located on the individual's neck may register a significantly greater height change. Therefore, by using two or more fall detection devices, the user device 104 may be able to more accurately determine whether the individual 102 has fallen.

While only the movement sensor 302 and the height sensor 304 are shown in FIG. 3, in some examples, the fall detection device 300 may include additional and/or alternative sensors.

The fall detection processor(s) 306 may be any type of hardware and/or software logic, such as a central processing unit (CPU), RASPBERRY PI processor/logic, controller, and/or logic, that executes computer executable instructions for performing the functions, processes, and/or methods described herein. For example, the fall detection processor(s) 306 may receive movement and/or height information from the movement sensor 302 and the height sensor 304. Further, the fall detection processor(s) 306 may retrieve a fall detection model 310 for movement and height information from memory 308. The fall detection model 310 may be any type of model, algorithm, process, equation, and/or other type of implementation that uses the movement information and the height information to determine whether the individual 102 has fallen. For instance, the fall detection model 310 may be a Hidden Markov Model (HMM) and/or a Monte Carlo Simulation Model. The fall detection processor(s) 306 may input the height information and/or the movement information into the fall detection model 310 (e.g., HMM) to determine whether the individual 102 has fallen.

Furthermore, the fall detection processor(s) 306 may update the fall detection model 310 based on user feedback from the user device 104. For example and as will be described in further detail below, the user device 104 may receive user input (or lack of user input) as to whether the individual 102 actually fell. Based on the user feedback (e.g., received user input or lack of user input), the fall detection processor(s) 306 may update the fall detection model 310 to individualize this model for the individual 102 such that it is more accurate for the individual 102. For instance, different height and movement parameters may indicate a taller individual has fallen as compared to a shorter individual. Accordingly, the fall detection processor(s) 306 may update and individualize the fall detection model 310 such that it is more accurate for the individual 102 regardless of their height or other characteristics.

The fall detection device 300 includes memory 308. Memory 308 includes the fall detection model 310 that is used to determine whether the individual 102 fell. The fall detection processor(s) 306 may update the fall detection model 310 and store this model 310 back into memory 308 so it may be used in future iterations.

In some examples, the memory 308 may be and/or include a computer-usable or computer-readable medium such as, but not limited to, an electronic, magnetic, optical, electromagnetic, infrared, or semiconductor computer-readable medium. More specific examples (e.g., a non-exhaustive list) of the computer-readable medium may include the following: an electrical connection having one or more wires; a tangible medium such as a portable computer diskette, a hard disk, a time-dependent access memory (RAM such as the RAM 208), a ROM such as ROM 206, an erasable programmable read-only memory (EPROM or Flash memory), a compact disc read-only memory (CD_ROM), or other tangible optical or magnetic storage device. The computer-readable medium may store computer-readable instructions/program code for carrying out operations of the present application. For example, when executed by the fall detection processor(s) 306, the computer-readable instructions/program code may carry out operations described herein.

The fall detection device 300 includes a communication (e.g., network) interface 314. The fall detection processor(s) 306 uses the communication interface 314 to communicate with other devices and/or systems within the environment 100. The communication interface 314 may include the functionalities and/or be the network interface 212 shown in FIG. 2. For example, the fall detection processor(s) 306 may receive and/or provide information 316 to the user device 104 using the communication interface 314.

Figure 4:
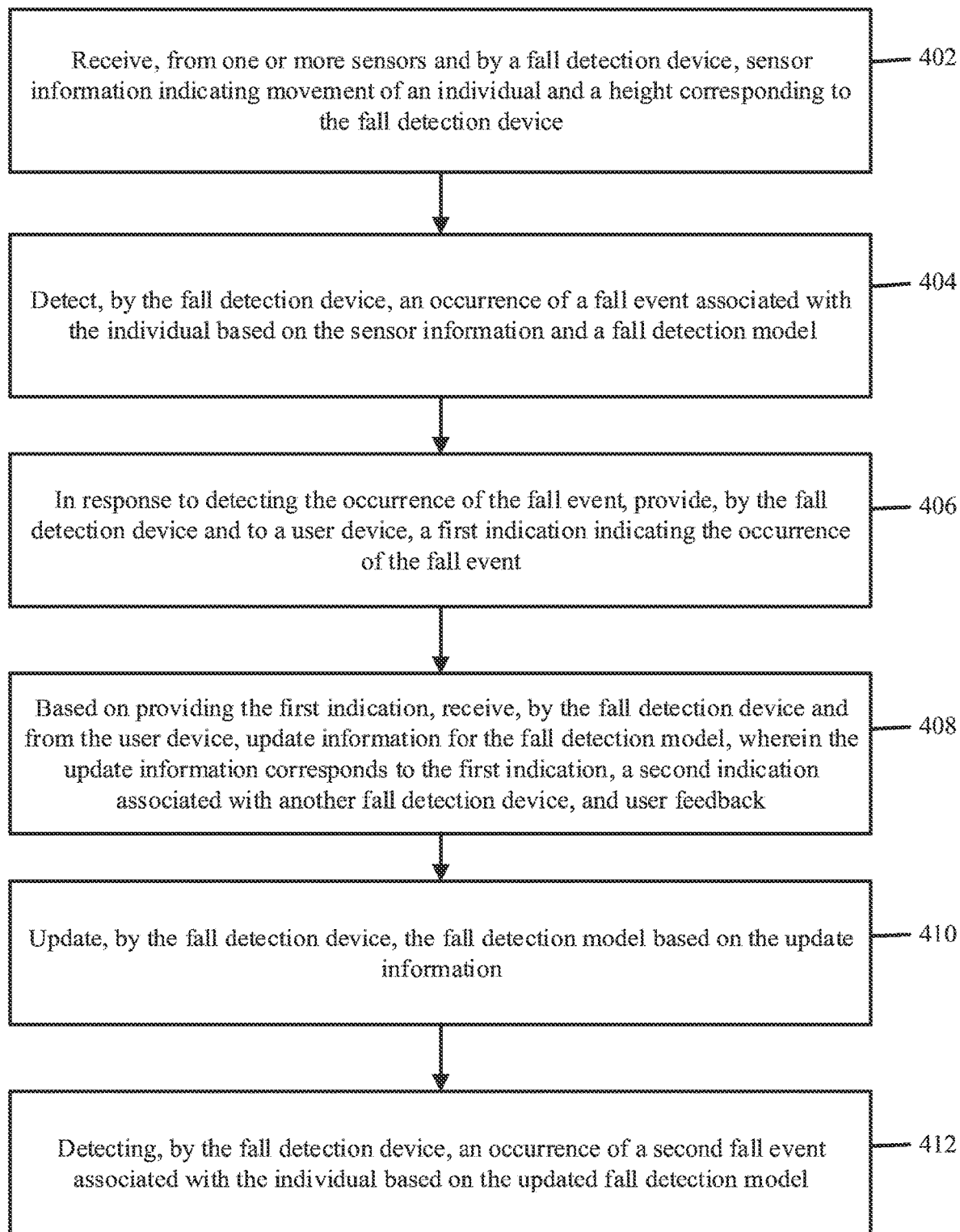
FIG. 4 is an exemplary process for using multiple fall detection devices for detecting a fall event in accordance with one or more examples of the present application.

FIG. 4 is an exemplary process 400 for operating a fall detection device to determine whether an individual 102 has fallen in accordance with one or more examples of the present application. The process 400 may be performed by the first fall detection device 108 and/or the second fall detection device 110 of environment 100 shown in FIG. 1. As described above, the first and/or second fall detection device 108, 110 may be and/or include the components of the fall detection device 300 shown in FIG. 3. However, it will be recognized that a fall detection device that includes additional and/or fewer components as shown in FIG. 3 may be used to perform process 400, that any of the following blocks may be performed in any suitable order, and that the process 400 may be performed in any suitable environment. The descriptions, illustrations, and processes of FIG. 4 are merely exemplary and the process 400 may use other descriptions, illustrations, and processes for determining whether an individual 102 has fallen.

At block 402, a fall detection device (e.g., the fall detection device 108, 110, and/or any device that includes the components of fall detection device 300) may receive, from one or more sensors, sensor information indicating movement of an individual (e.g., individual 102) and a height corresponding to the fall detection device. For example, as described above, the fall detection device may include sensors such as a movement sensor (e.g., sensor 302) that detects movement information (e.g., displacement, velocity, and/or acceleration) and a height sensor (e.g., sensor 304) that detects a height (e.g., distance from the ground) of the fall detection device. The height sensor may be and/or include a distance sensor, a pressure sensor, and/or a light sensor. In other words, the height sensor may determine the height based on a pressure measurement, a light measurement, and/or a distance measurement from the ground. The movement sensor may detect movement of a body part of the individual 102. For example, as mentioned above, the fall detection device may be operatively coupled or positioned on a particular part of the individual's body (e.g., arm, leg, neck, and so on). The body part may move and the movement sensor may detect this movement.

In some examples, as shown in environment 100 of FIG. 1, there may be a first fall detection device (e.g., a primary or first fall detection device 108) and a second fall detection device (e.g., a redundant or second fall detection device 110). The two fall detection devices 108 and 110 may be positioned at different locations of the individual 102. For instance, the first fall detection device 108 may be positioned on an individual's body part that is movable or rotatable such as a limb or appendage (e.g., leg). The second fall detection device 110 may be positioned on a symmetrical portion of the individual's body such as the neck. By using two different devices 108 and 110, these devices may both perform process 400 and determine different results (e.g., whether the individual 102 has fallen). For instance, when the individual is walking and upright, the first fall detection device 108 that is positioned on the individual's leg may detect movement using the movement sensor 302 and a height change using the height sensor 304, but the second fall detection device 110 might not detect movement nor a height change. When the individual falls, both the first and second fall detection devices 108 and 110 may detect movement and a height change. As will be described below, the user device 104 may receive indications as to whether an individual 102 fell from both devices 108 and 110. In other words, the two devices may determine conflicting results (e.g., the first device 108 may indicate the individual fell whereas the second device 110 might not indicate the individual fell). In such instances, the user device 104 may determine which device 108 and 110 is correct based on user input and/or other factors. Then, the user device 104 may update the fall detection models 310 for these devices.

At block 404, the fall detection device may detect an occurrence of a fall event associated with the individual based on the sensor information (e.g., the movement/height information from the sensors 302 and 304) and a fall detection model. The occurrence of a fall event may be the fall detection device determining that the individual 102 has fallen. In other words, the fall event may be the individual 102 actually falling or the fall detection device determining that the individual 102 has fallen, but the individual 102 actually did not fall. In the instances where the individual did not fall, the user device 104 may receive user input indicating the individual 102 did not fall and the user device 104 may provide update information to the fall detection device (e.g., 108 and/or 110) to update the fall detection model (e.g., model 310).

As described above, the fall detection model may be any type of model, algorithm, or so on that permits the fall detection device to determine the occurrence of the fall detection event. In some instances, the fall detection model may be an HMM and may be stored within the memory of the fall detection device. The fall detection device may retrieve this model and input the movement and height information from the sensors to determine an occurrence of a fall event. The fall event may be an indication that the individual 102 has fallen. In some instances, the fall detection model may be an HMM that is associated with a plurality of coefficients that are placed into one or more arrays. The coefficients and arrays may be associated with the transition probability and emission probability of the HMM. The detected acceleration values from the fall detection devices 108 and 110 may be placed into the HMM and the coefficients associated with the transition and emission probabilities may be used to determine whether the individual 102 has fallen.

At block 406, in response to detecting the occurrence of the fall event, the fall detection device may provide, to a user device (e.g., user device 104), a first indication indicating the occurrence of the fall event. For example, using the movement and/or height information, the fall detection device may determine the individual 102 has fallen and provide a first indication indicating this to the user device 104. The user device 104 may use the first indication to determine whether the individual 102 actually fell. For example, both fall detection devices 108 and 110 may provide indications to the user device 104 indicating the individual 102 fell. The user device 104 may use these indications to determine the individual 102 actually fell.

Additionally, and/or alternatively, one fall detection device (e.g., 108) may determine the occurrence of a fall event and provide the first indication. The other fall detection device (e.g., 110) may provide information indicating the individual 102 has not fallen. The user device 104 may resolve the conflict of these devices 108, 110 to determine whether the individual 102 actually fell such as by using different weighted values for the two fall detection devices 108, 110. For instance, based on the positions of the fall detection devices on the individual's body (e.g., leg as compared to neck), the user device 104 may assign different weighted values for these devices. In some examples, the fall detection device positioned on the neck may be associated with a higher weighted value as compared to the fall detection device positioned on the leg. In other examples, these weighted values may be reversed (e.g., the leg fall detection device may have the higher weighted value).

After determining whether the individual 102 has fallen based on these two values, the user device 104 may cause display of a prompt or notification indicating the fall event. The prompt may include text indicating the user device 104 has detected a fall event and/or a timer. The timer may indicate an amount of time the individual 102 has prior to notifying a caretaker, family member, emergency contact, medical personal, or another person the individual 102 has identified to the enterprise organization that should be notified in the event of a fall. The prompt may further include a button, toggle switch, or a region on a graphical user interface (GUI) that permits user interaction or selection. For example, the prompt may be a GUI with a region or portion that when selected, permits the individual 102 to indicate they have not fallen, the fall was not serious (e.g., the individual 102 was not hurt by the fall), and/or the individual 102 has fallen and needs assistance. Based on the lack of user input and/or user input indicating the individual 102 needs assistance, the user device 104 may provide information to the enterprise computing system 112 indicating the individual 102 needs assistance. The enterprise computing system 112 may notify the appropriate person (e.g., a caretaker) such that this person may provide assistance to the individual 102. For instance, the enterprise computing system 112 may provide an indication to the fall detection alert device 114 (e.g., caretaker mobile device) that the individual 102 has fallen and needs assistance. Based on user input indicating the fall was not serious and/or the individual 102 did not actually fall, the user device 104 might not provide information to the enterprise computing system 112 indicating the individual 102 requires assistance.

Figure 7:
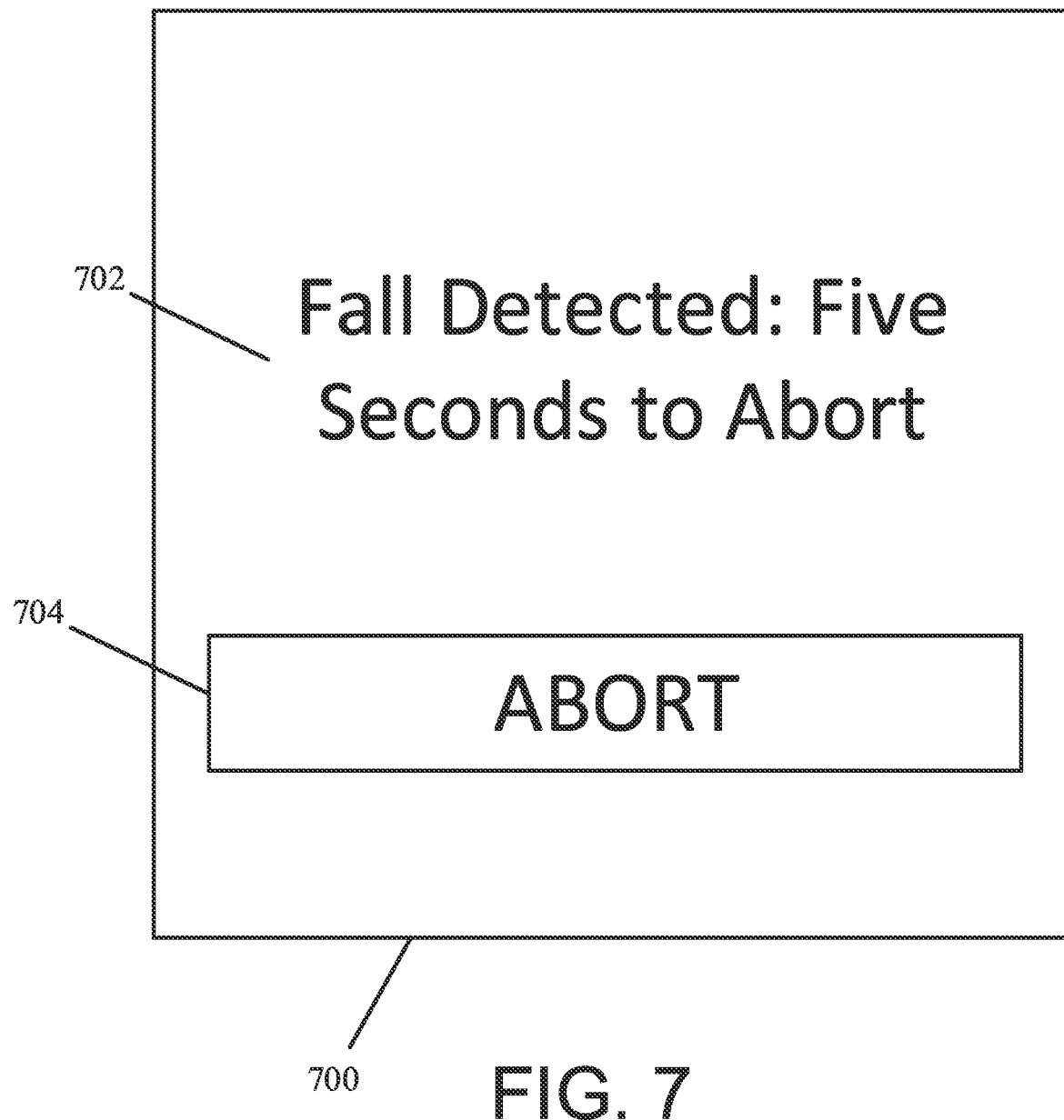
FIG. 7 is a display screen capable of being shown on the display device of a user device in accordance with one or more examples of the present application.

FIG. 7 shows a display screen 700 that the user device 104 may display to indicate the fall event. The display screen 700 is merely exemplary and the user device 104 may display a different display screen indicating the prompt or notification. Referring to FIG. 7, the display screen 700 may display text 702 stating "Fall Detected: Five Seconds to Abort". The display screen 700 may be GUI and further include a region 704 on the display screen indicating "ABORT". When selected, the user device 104 may abort sending information to the enterprise computing system 112 indicating the individual 102 requires assistance.

Referring back to block 406, in some examples, the user device 104 may receive information of the fall event from one fall detection device and might not receive any type of information from the other fall detection device. For example, the first fall detection device 108 may detect the occurrence of the fall detection event and provide an indication to the user device 104. The second fall detection device 110 might not detect an occurrence of a fall event and might not provide any type of information (e.g., information indicating the individual 102 has fallen or the individual 102 has not fallen) to the user device 104. In such examples, the user device 104 may determine the lack of information as the second fall detection device 110 did not detect that the individual 102 has not fallen. Then, the user device 104 may proceed as described above (e.g., using weighted values for the different fall detection devices to assess whether the individual 102 actually fell).

Additionally, and/or alternatively, the user device 104 may provide a request to the second fall detection device 110. The request may indicate for the second fall detection device 110 to provide information as to whether it has detected an occurrence of a fall event. Based on the request, the user device 104 may determine whether the individual 102 has actually fallen.

In some variations, the user device 104 may update the weighted values for the different fall detection devices based on the user feedback. For example, one fall detection device (e.g., device 108) may detect a fall event whereas the other fall detection device (e.g., device 110) might not detect a fall event. Based on the user input indicating the individual 102 did not fall, the user device 104 may update the weighted values such that the fall detection device that detected the fall event is decreased and/or the fall detection device that did not detect the fall event is increased. Based on the user input indicating the individual 102 did fall or the lack of the user input (e.g., the fall may have knocked the individual 102 unconscious or incapacitated so they might not be able to provide a user input), the user device 104 may update the weighted values such that the fall detection device that detected the fall event is increased and/or the fall detection device that did not detect the fall event is decreased.

At block 408, based on providing the first indication indicating the occurrence of the fall event, the fall detection device may receive, from the user device 104, update information for the fall detection model. The update information corresponds to the first indication, a second indication associated with another fall detection device, and user feedback. The update information may be used to update the fall detection model such as by including information indicating the individual 102 actually fell. Additionally, and/or alternatively, the update information may indicate one or more actual updates to the fall detection model.

For instance, at block 404, the first fall detection device 108 detects the occurrence of the fall event, but the individual 102 might not have fallen. The user device 104 may provide update information based on the user feedback indicating the individual 102 did not fall (e.g., by selecting the "ABORT" region 704 on the GUI 700).

Furthermore, the other fall detection device (e.g., the second fall detection device 110) may provide another (e.g., second) indication indicating whether the individual 102 fell. In some examples, the second indication may indicate the individual 102 fell, but the user feedback may indicate the individual 102 did not fall. In such instances, the user device 104 may provide update information to both the first and the second fall detection devices 108 and 110 to update their fall detection models. In other examples, the second indication from the second fall detection device 110 may indicate the individual 102 did not fall and the user feedback may indicate the individual 102 did not fall as well. Based on this, the user device 104 may provide update information to the first fall detection device 108 to update the fall detection model of the device 108. In yet other examples, the second indication from the second fall detection device 110 may indicate the individual 102 did not fall, but the user feedback may indicate the individual fell. In such examples, the user device 104 may provide update information to the second fall detection device 110. Additionally, and/or alternatively, the user device 104 may further provide update information to the first fall detection device 108 as well.

In some instances, the second fall detection device 110 might not detect an occurrence of a fall detection event and might not provide information to the user device 104. The second indication may be the second fall detection device 110 not providing information to the user device 104.

At block 410, the fall detection device may update the fall detection model based on the update information. The fall detection device may update the fall detection model (e.g., model 310) accordingly and then store the updated model back in memory (e.g., memory 308). For example, as mentioned above, in some instances, the fall detection model may be an HMM that is associated with a plurality of coefficients. Based on the user feedback, the user device 104 may provide update information such as an indication to update one or more of the plurality of coefficients associated with the HMM. In some instances, the update information may include the actual updated coefficients (e.g., the user device 104 may determine the updated coefficients and provide the updated coefficients within the update information). In other instances, the update information may include an indication for the fall detection device (e.g., device 108 and/or 110) to update the coefficients themselves. In other words, based on the indication that the individual 102 has fallen or has not fallen, the fall detection devices 108 and/or 110 may update their own HMMs such as by updating the coefficients (e.g., transition and emission probabilities) of the HMM in their memory 308. The fall detection devices 108 and/or 110 may use the updated HMM in the next iteration to determine whether the individual 102 has fallen.

In other words, the fall detection devices 108 and/or 110 may have their own fall detection models (e.g., HMM) stored within memory 308. Initially, these fall detection models may be similar (e.g., have similar coefficients). However, while one set of coefficients may be useful to determine whether one individual 102 has fallen, it might not be as accurate when determining whether another individual 102 has fallen. For instance, taller individuals may require different sets of coefficients as compared to shorter individuals. Accordingly, even if the fall detection models may be similar at the onset, the fall detection devices 108 and/or 110 may use the update information to update these coefficients to ensure they become more and more accurate for the particular individual 102. For instance, based on the device's determination as to whether the individual 102 has fallen and the user feedback indicating whether the individual 102 actually fell, the fall detection devices 108 and/or 110 may update the coefficients such that they are more accurate. These coefficients may be continuously updated.

Additionally, and/or alternatively, the fall detection devices 108 and/or 110 may update their fall detection models (e.g., the coefficients within the HMM) differently from each other. For instance, one fall detection device (e.g., device 108) that is located on a particular body part (e.g., leg/arm) may be initially more accurate than another fall detection device (e.g., device 110) that is located on another body part (e.g., neck). As such, the user feedback may indicate the fall detection device 108 is accurate in its determination of whether the individual 102 has fallen and that the fall detection device 110 is inaccurate in its determination. Based on this, the fall detection devices 108 and/or 110 may update their models (e.g., coefficients) differently such as by updating the coefficients within the fall detection device 110 more drastically than the coefficients of fall detection device 108.

At block 412, the fall detection device may detect an occurrence of a second fall event associated with the individual based on the updated fall detection model. For example, after updating the fall detection model in block 410, the fall detection device may use new sensor information (e.g., movement/height information) and the updated model to detect the occurrence of fall events for the individual 102. In other words, the fall detection model may be individualized for the individual 102 such that the model continues to be updated based on the accuracy or inaccuracy of its respective fall detection device.

In some instances, initially, a fall detection model 310 may be pre-determined or pre-set for all individuals. However, each individual may be unique. For instance, individuals may be of different heights and therefore, a shorter individual may have different movement/height characteristics than a taller individual. By continuously updating the fall detection model 310 based on user feedback and the two fall detection devices 108 and 110, the fall detection devices 108 and 110 may be able to individualize their fall detection models for the individual 102 such that these models continuously increases in accuracy in detecting whether the individual 102 has actually fallen.

Additionally, and/or alternatively, the weighted values of the first and second fall detection devices 108 and 110 that are used by the user device 104 to provide the prompt indicating the individual has fallen may also be updated and individualized for the individual 102. For example, individuals may have different stride lengths and as such, a fall detection device that is positioned on an individual's leg may be more accurate for certain individuals, but less accurate for others. The user device 104 may update the weighted values such that they can be individualized for a particular individual 102.

Figure 5:
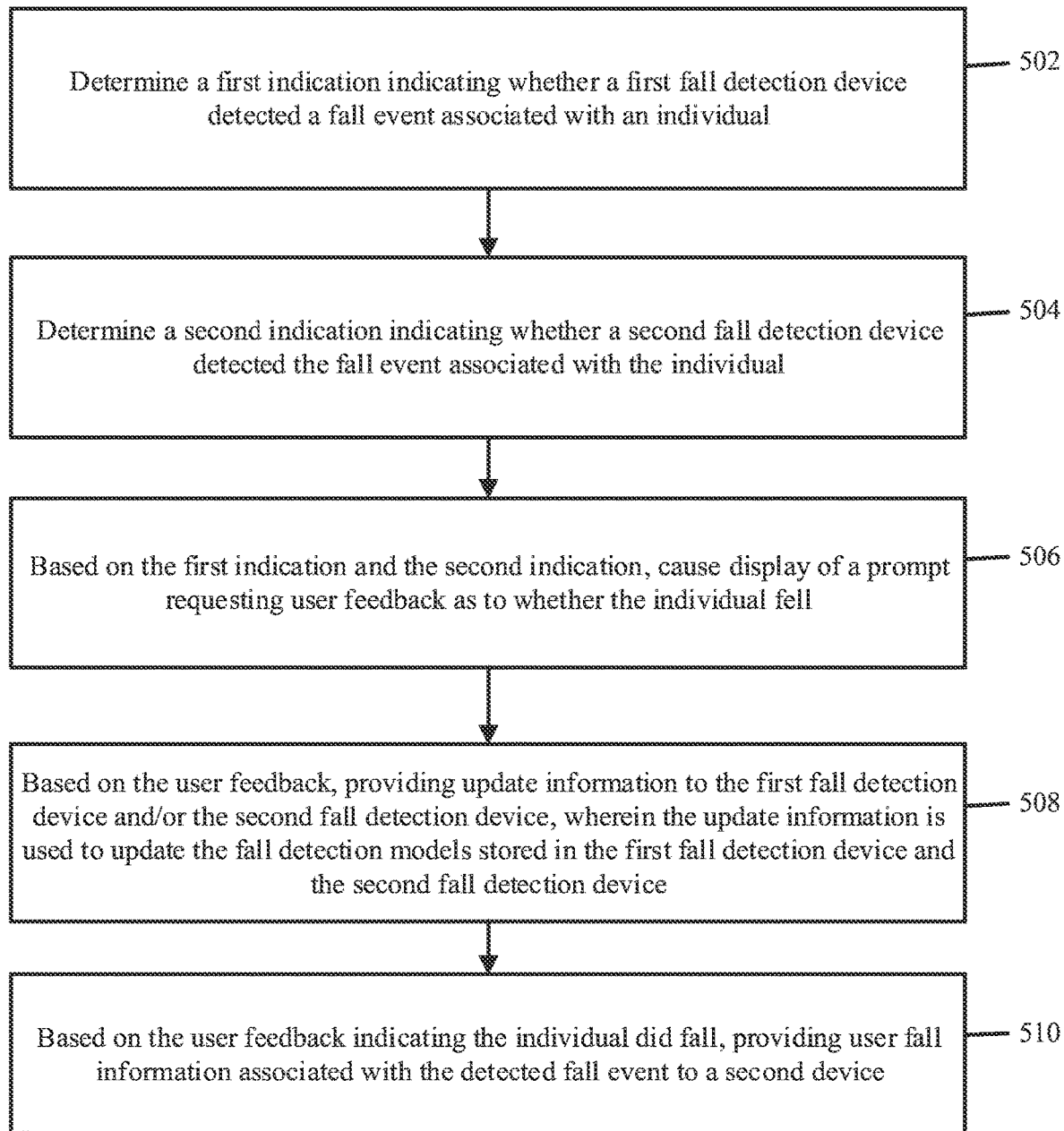
FIG. 5 is another exemplary process for using multiple fall detection devices for detecting a fall event in accordance with one or more examples of the present application.

FIG. 5 is an exemplary process 500 for operating a user device to determine whether an individual has fallen in accordance with one or more examples of the present application. The process 500 may be performed by the user device 104 of environment 100 shown in FIG. 1. It will be recognized that any of the following blocks may be performed in any suitable order and that the process 500 may be performed in any suitable environment. The descriptions, illustrations, and processes of FIG. 5 are merely exemplary and the process 500 may use other descriptions, illustrations, and processes for determining whether an individual has fallen.

At block 502, a user device (e.g., user device 104) may determine a first indication indicating whether a first fall detection device (e.g., fall detection device 108) detected a fall event associated with an individual 102. At block 504, the user device may determine a second indication indicating whether a second fall detection device (e.g., fall detection device 110) detected a fall event associated with an individual 102. As described above in process 400, the user device may determine the first and/or second indication based on receiving information indicating the fall event or indicating the individual 102 did not fall. Additionally, and/or alternatively, the user device may determine the first and/or second indication based on a lack of receiving information from the first or second fall detection device.

At block 506, based on the first and second indications, the user device may cause display of a prompt requesting user feedback as to whether the individual actually fell. In some instances, as described above, the user device may use weighted values for the first and second fall detection devices to determine whether to display the prompt. The prompt may be a display screen such as display screen 700 that includes a region or button for the individual 102 to provide feedback.

At block 508, based on the user feedback, the user device provides update information to the first and/or second fall detection devices. The update information may be used by the first and/or second fall detection devices to update the fall detection models stored in the first and/or second fall detection devices. For example, as described above, one of the two fall detection devices (e.g., 108 and/or 110) may have detected a fall event and the user feedback may indicate the individual did not fall. Based on this, the user device may provide update information to update the fall detection models such that in the next iteration, the fall detection models may be corrected to more accurately determine whether the individual fell. Additionally, and/or alternatively, one of the two fall detection devices may have not detected a fall event and the user feedback may indicate the individual did fall. For example, the user feedback indicating the individual did fall may include the individual providing user input to the user device indicating the individual fell or the user device not receiving any user input for a set time period (e.g., a timer such as five seconds elapsing). Based on the user feedback and one of the fall detection devices not detecting a fall event, the user device may provide update information such that in the next iteration, the fall detection models may be corrected to more accurately determine whether the individual fell.

At block 510, based on the user feedback indicating the user did fall, the user device may provide user fall information associated with the detected fall event to a second device. The user fall information may indicate the individual 102 has fallen and/or needs assistance. Additionally, and/or alternatively, the user fall information may indicate a date/time stamp of the fall, geographical coordinates where the fall occurred, and/or other information. The second device may be an enterprise computing system such as system 112. The enterprise computing system 112 may use the user fall information to determine a person such as a caretaker to contact to assist the individual 102. The enterprise computing system 112 may provide a notification to the fall detection alert device 114 (e.g., a caretaker mobile device) based on the user fall information from the user device 104. Additionally, and/or alternatively, the second device may be the fall detection alert device 114. In other words, the user device 104 may directly provide the notification to the fall detection alert device 114 and bypass providing information to the enterprise computing system 112.

Figure 6:
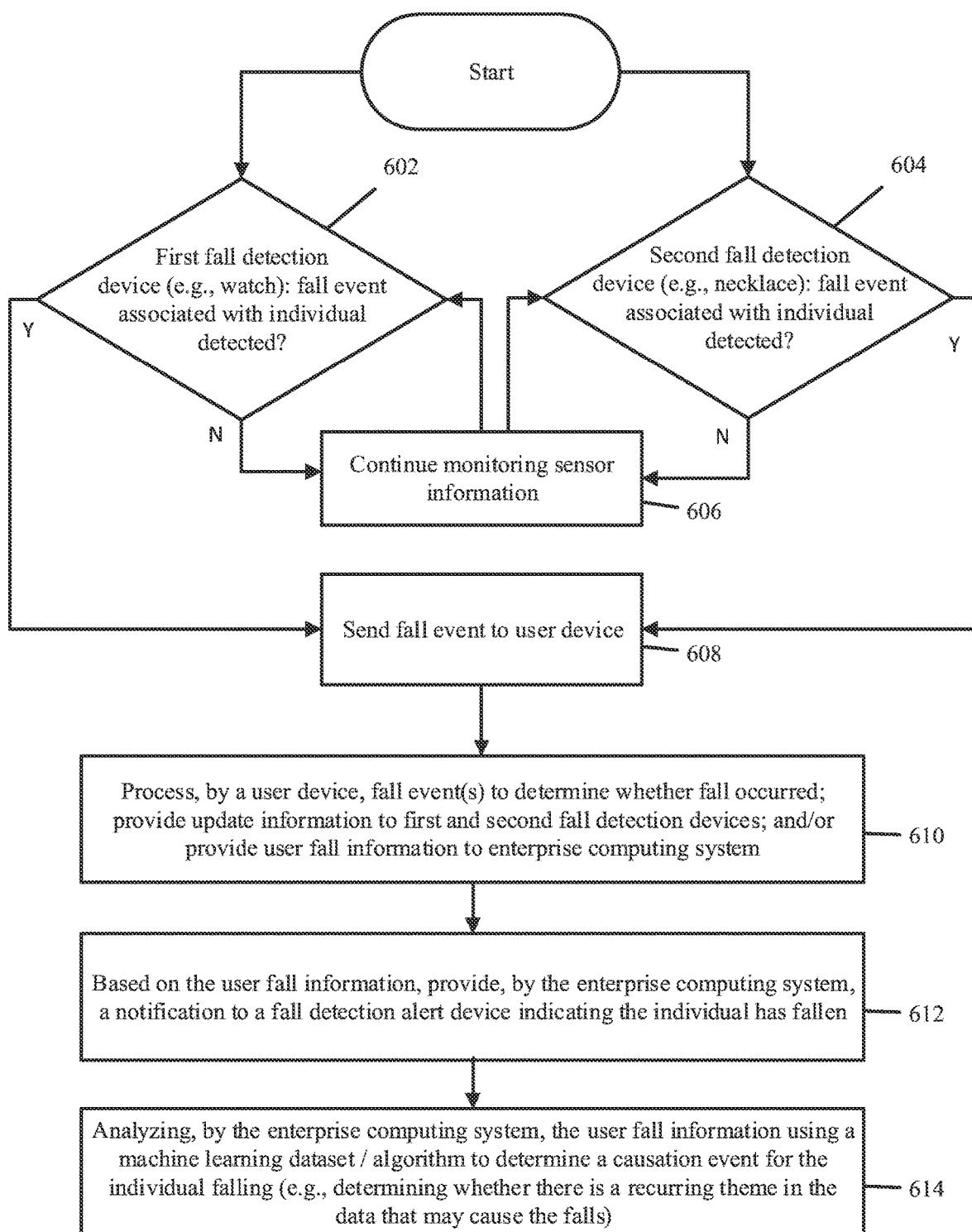
FIG. 6 is yet another exemplary process for using multiple fall detection devices for detecting a fall event in accordance with one or more examples of the present application.

FIG. 6 is an exemplary process 600 for determining whether an individual 102 has fallen in accordance with one or more examples of the present application. The process 600 may be performed by the devices and/or systems of environment 100 shown in FIG. 1. It will be recognized that any of the following blocks may be performed in any suitable order and that the process 600 may be performed in any suitable environment. The descriptions, illustrations, and processes of FIG. 6 are merely exemplary and the process 600 may use other descriptions, illustrations, and processes for determining whether an individual 102 has fallen.

At blocks 602 and 604, the first fall detection device 108 and the second fall detection device 110 may detect a fall event associated with an individual 102. The first and second fall detection devices 108 and 110 may be wearable devices that are positioned at different locations on the individual's body such as a watch and a necklace. If either device 108 and/or 110 detects a fall event, the process 600 may move to block 608 and the device 108 and/or 110 may send the fall event to the user device 104. If not, the process 600 may move to block 606 and the devices 108 and/or 110 may continue monitoring sensor information.

At block 610, the user device 104 may process the fall event(s) to determine whether a fall occurred, provide update information to the first and/or second fall detection devices 108, 110, and/or provide user fall information to an enterprise computing system 112. This is described in further detail above in process 400 and 500.

At block 612, the enterprise computing system 112 may provide, based on the user fall information, a notification to a fall detection alert device 114 indicating the individual 102 has fallen. For example, the user fall information may include information indicating the individual 102 has fallen, a user identifier (ID), a time/date stamp of the fall, and/or geographical coordinates of the individual 102 (e.g., location of the user device 104 and/or the fall detection devices 108/110). The enterprise computing system 112 may determine a caretaker, emergency contact, and/or emergency agency/personnel based on the user ID from the user fall information. Then, the enterprise computing system 112 may provide a notification to a fall detection alert device 114 associated with the caretaker, emergency contact, and/or emergency agency.

At block 614, the enterprise computing system 112 may analyze the user fall information using a machine learning dataset/algorithm to determine a causation event for the individual falling. For example, the enterprise computing system 112 may input the user fall information and/or other information into a machine learning dataset to determine whether there is a recurring theme within the data that may cause the individual 102 to fall. In some instances, the enterprise computing system 112 may be associated with a healthcare enterprise organization that has prescription information for the individual 102. For instance, the enterprise computing system 112 may retrieve, obtain, and/or receive prescription information such as medications and/or prescriptions for the individual 102 based on the user ID. The enterprise computing system 112 may input the prescription information (e.g., medication and prescriptions) and the user fall information (e.g., a time, date, location, and so on) from the user device 104 into a machine learning dataset to identify a causation event that may have caused the individual 102 to fall. For example, the prescription information may indicate that the individual 102 should take a medication every morning at 8 A.M. The user fall information may indicate that the individual 102 repeatedly falls at around 10 A.M. Based on inputting the prescription and user fall information into the machine learning dataset, the enterprise computing system 112 may determine the medication was the cause of fall and/or that falling may be a side-effect of the medication. In such instances, the enterprise computing system 112 may provide this determination to another entity such as the physician for the individual 102 or a pharmacist.

In some examples, the enterprise computing system 112 may use any type of machine learning dataset and/or algorithm (e.g., supervised artificial intelligence algorithms, unsupervised artificial intelligence algorithms, and/or deep learning algorithms) to determine a causation event/cause of the individual 102 falling. In some instances, the enterprise computing system 112 may train and/or update this machine learning dataset and/or algorithm. For example, the enterprise computing system 112 may obtain data such as the indication of an individual falling, the location (e.g., geographical location) where the fall occurred, one or more medications taken by the individual, and/or a date/time stamp associated with the individual falling. The enterprise computing system 112 may prepare the data (e.g., standardize it) and/or otherwise re-format the data such that it is able to be used to train the machine learning dataset. The enterprise computing system 112 may split the data into training data and test data. Then, the enterprise computing system 112 may train the machine learning dataset using the training data to reach a target. For example, the enterprise computing system 112 may train the machine learning dataset by determining whether the training data is continuous or discreet and/or using one or more regression/classification algorithms After training the dataset, the enterprise computing system 112 may test the trained model using the test data. The enterprise computing system 112 may perform another continuous or discreet analysis and render a decision. Finally, after the machine learning dataset is trained, the enterprise computing system 112 may use the trained dataset to determine whether the individual 102 falling was caused by a medication the individual 102 was taking.

In some examples, one or more environmental sensors may be used in connection with the fall detection devices 108 and/or 110 to determine whether the individual 102 fell. For example, the environmental sensors may be located within the individual's 102 residence or dwelling and may be in communication with the user device 104 via a wireless communication protocol (e.g., BLUETOOTH, WI-FI, and so on). The environmental sensors may provide information indicating whether the individual 102 has fallen. The user device 104 may receive this information from the environmental sensors as well as one or more fall events from the fall detection devices 108 and/or 110. Based on feedback from these devices/sensors, the user device 104 may determine whether the individual 102 has fallen. For example, when all of these devices (e.g., device 108, device 110, and the environmental sensors) provide information to the user device 104 that the individual 102 may have fallen, the user device 104 may determine the individual 102 has fallen and display a prompt as described above in block 506. Additionally, and/or alternatively, if there is a conflict between these devices (e.g., device 108 and 110 provide information indicating the individual 102 has fallen, but the environmental sensors indicate the individual 102 has not fallen), the user device 104 may use one or more weighed values to determine whether the individual 102 has fallen. In some examples, as described above, the weighted values for these devices, including the environmental sensors, may be updated based on user feedback. In other words, in addition to the redundant fall detection devices 108 and 110, the environmental sensors may be another redundant device to determine whether the individual 102 has actually fallen.

In some instances, the environmental sensors may include pressure sensors interwoven into the floor. These pressure sensors may be placed within the residence of the individual 102 and provide information indicating whether the individual 102 is stepping on them. Then, these sensors may accurately determine from the last known position of the individual 102 that the individual 102 might be laying on the floor and that a fall has occurred. The sensors may provide an indication indicating the individual 102 has fallen to the user device 104.

In some variations, the environmental sensors may include light motion and/or active sonar distance sensors that are positioned in the ceiling of the residence of the individual 102. These sensors may detect motion within a room and may observe a distance from the sensor to the individual 102. In other words, they may provide information indicating that an individual is walking or moving around their residence. When an individual 102 falls, the sensors may react to the angular motion of the fall based on the change of distance measured to the individual 102. For example, initially, the sensor may be measuring the individual's head, but then it may be measuring an angle of the individual 102 lying on the floor. The sensor may use a timer to determine whether the individual 102 has fallen. For example, if the sensor detects that this change occurred within two seconds, then the sensor may determine that the individual 102 actually fell rather than wanting to just lie on the floor. The sensor may provide an indication of the fall to the user device 104.

In some variations, the environmental sensors may be a smart camera that is positioned within a room of the individual 102. The smart camera may detect the individual 102 moving through the room. Further, the smart camera may use one or more machine learning algorithms to determine whether the individual 102 fell. For example, if the individual 102 falls within a certain amount of time, the smart camera may determine the individual 102 has fallen using the machine learning algorithm and then send an indication to the user device 104.

A number of implementations have been described. Nevertheless, it will be understood that additional modifications may be made without departing from the scope of the inventive concepts described herein, and, accordingly, other examples are within the scope of the following claims. For example, it will be appreciated that the examples of the application described herein are merely exemplary. Variations of these examples may become apparent to those of ordinary skill in the art upon reading the foregoing description. The inventor expects skilled artisans to employ such variations as appropriate, and the inventor intends for the application to be practiced otherwise than as specifically described herein. Accordingly, this application includes all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

It will further be appreciated by those of skill in the art that the execution of the various machine-implemented processes and steps described herein may occur via the computerized execution of processor-executable instructions stored on a non-transitory computer-readable medium, e.g., random access memory (RAM), read-only memory (ROM), programmable read-only memory (PROM), volatile, nonvolatile, or other electronic memory mechanism. Thus, for example, the operations described herein as being performed by computing devices and/or components thereof may be carried out by according to processor-executable instructions and/or installed applications corresponding to software, firmware, and/or computer hardware.

The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the application and does not pose a limitation on the scope of the application unless otherwise claimed. No language in the specification should be construed as indicating any non-claimed element as essential to the practice of the application.

The invention claimed is:

1. A fall detection system, comprising:
an enterprise computing system, comprising:
one or more first processors; and
a first non-transitory computer-readable medium having first processor-executable instructions stored thereon, wherein the first processor-executable instructions, when executed, facilitate:
training one or more machine learning (ML) datasets;
obtaining, from a user device associated with an individual, user fall information indicating the individual has fallen;
obtaining prescription information indicating one or more medical prescriptions for the individual;
subsequent to training the one or more ML datasets, inputting the user fall information and the prescription information into the one or more ML datasets to determine causation information indicating whether the one or more medical prescriptions caused the individual to fall; and
providing the causation information to a second computing device.

2. The fall detection system of claim 1, wherein the user fall information comprises a user identifier (ID) indicating an identity of the individual, and
wherein the first processor-executable instructions, when executed, facilitate:
providing the user ID to a healthcare computing device, and
wherein obtaining the prescription information is in response to providing the user ID to the healthcare computing device.

3. The fall detection system of claim 1, wherein the user fall information comprises information indicating a time stamp associated with the individual falling,
wherein the prescription information indicates a time for the individual to take a medication, and
wherein inputting the user fall information and the prescription information into the one or more ML datasets comprises inputting the time stamp and the time for the individual to take the medication into the one or more ML datasets to determine the causation information.

4. The fall detection system of claim 1, further comprising:
a fall detection device comprising:
one or more second processors; and
a second non-transitory computer-readable medium having second processor-executable instructions stored thereon, wherein the second processor-executable instructions, when executed, facilitate:
detecting an occurrence of a fall event associated with the individual based on first sensor information from one or more sensors and a fall detection model; and
providing, to the user device, an indication indicating the occurrence of the fall event; and
the user device comprising:
one or more third processors; and
a third non-transitory computer-readable medium having third processor-executable instructions stored thereon, wherein the third processor-executable instructions, when executed, facilitate:
based on the indication, causing display of a prompt requesting user feedback as to whether the individual fell;
based on the user feedback, providing, to the fall detection device, update information indicating for the fall detection device to update the fall detection model.

5. The fall detection system of claim 4, wherein the fall detection model is a Hidden Markov Model (HMM).

6. The fall detection system of claim 5, wherein the first sensor information comprises movement information indicating movement of the individual and height information indicating a height corresponding to the fall detection device, and
wherein detecting the occurrence of the fall event comprises:
inputting the movement information and the height information into the HMM to determine the occurrence of the fall event.

7. The fall detection system of claim 5, wherein the HMM comprises a plurality of coefficients associated with a transition probability and an emission probability, and
wherein detecting the occurrence of the fall event is based on the transition probability and the emission probability of the HMM.

8. The fall detection system of claim 7, wherein the second processor-executable instructions, when executed, further facilitate:
updating, based on the update information, the plurality of coefficients associated with the transition probability and the emission probability.

9. The fall detection system of claim 8, wherein the update information comprises a plurality of updated coefficients for updating the HMM.

10. The fall detection system of claim 4, wherein the fall detection model is a Monte Carlo Simulation Model.

11. The fall detection system of claim 10, wherein the first sensor information comprises movement information indicating movement of the individual and height information indicating a height corresponding to the fall detection device, and
wherein detecting the occurrence of the fall event comprises:
inputting the movement information and the height information into the Monte Carlo Simulation Model to determine the occurrence of the fall event.

12. The fall detection system of claim 4, further comprising:
one or more environmental sensors configured to:
detect environmental sensor information associated with the individual; and
provide the environmental sensor information to the user device, and wherein the third processor-executable instructions, when executed, further facilitate:
receiving the environmental sensor information from the one or more environmental sensors, and
wherein causing display of the prompt requesting the user feedback as to whether the individual fell is further based on the environmental sensor information.

13. The fall detection system of claim 12, wherein the one or more environmental sensors comprise one or more pressure sensors interwoven into a floor of a residence of the individual.

14. The fall detection system of claim 12, wherein the one or more environmental sensors comprise one or more light motion sensors.

15. The fall detection system of claim 12, wherein the one or more environmental sensors comprise one or more active sonar distance sensors.

16. A method, comprising:
training, by a fall detection system, one or more machine learning (ML) datasets;
obtaining, by the fall detection system and from a user device associated with an individual, user fall information indicating the individual has fallen;
obtaining, by the fall detection system, prescription information indicating one or more medical prescriptions for the individual;
subsequent to training the one or more ML datasets, inputting, by the fall detection system, the user fall information and the prescription information into the one or more learning ML datasets to determine causation information indicating whether the one or more medical prescriptions caused the individual to fall; and
providing, by the fall detection system, the causation information to a second computing device.

17. The method of claim 16, wherein the user fall information comprises a user identifier (ID) indicating an identity of the individual, and wherein the method further comprises:
providing the user ID to a healthcare computing device, and
wherein obtaining the prescription information is in response to providing the user ID to the healthcare computing device.

18. The method of claim 16, wherein the user fall information comprises information indicating a time stamp associated with the individual falling,
wherein the prescription information indicates a time for the individual to take a medication, and
wherein inputting the user fall information and the prescription information into the one or more ML datasets comprises inputting the time stamp and the time for the individual to take the medication into the one or more ML datasets to determine the causation information.

19. A non-transitory computer-readable medium having processor-executable instructions stored thereon, wherein the processor-executable instructions, when executed, facilitate:
training one or more machine learning (ML) datasets;
obtaining, from a user device associated with an individual, user fall information indicating the individual has fallen;
obtaining prescription information indicating one or more medical prescriptions for the individual;
subsequent to training the one or more ML datasets, inputting the user fall information and the prescription information into the one or more ML datasets to determine causation information indicating whether the one or more medical prescriptions caused the individual to fall; and
providing the causation information to a second computing device.

* * * * *